Patented Dec. 6, 1938

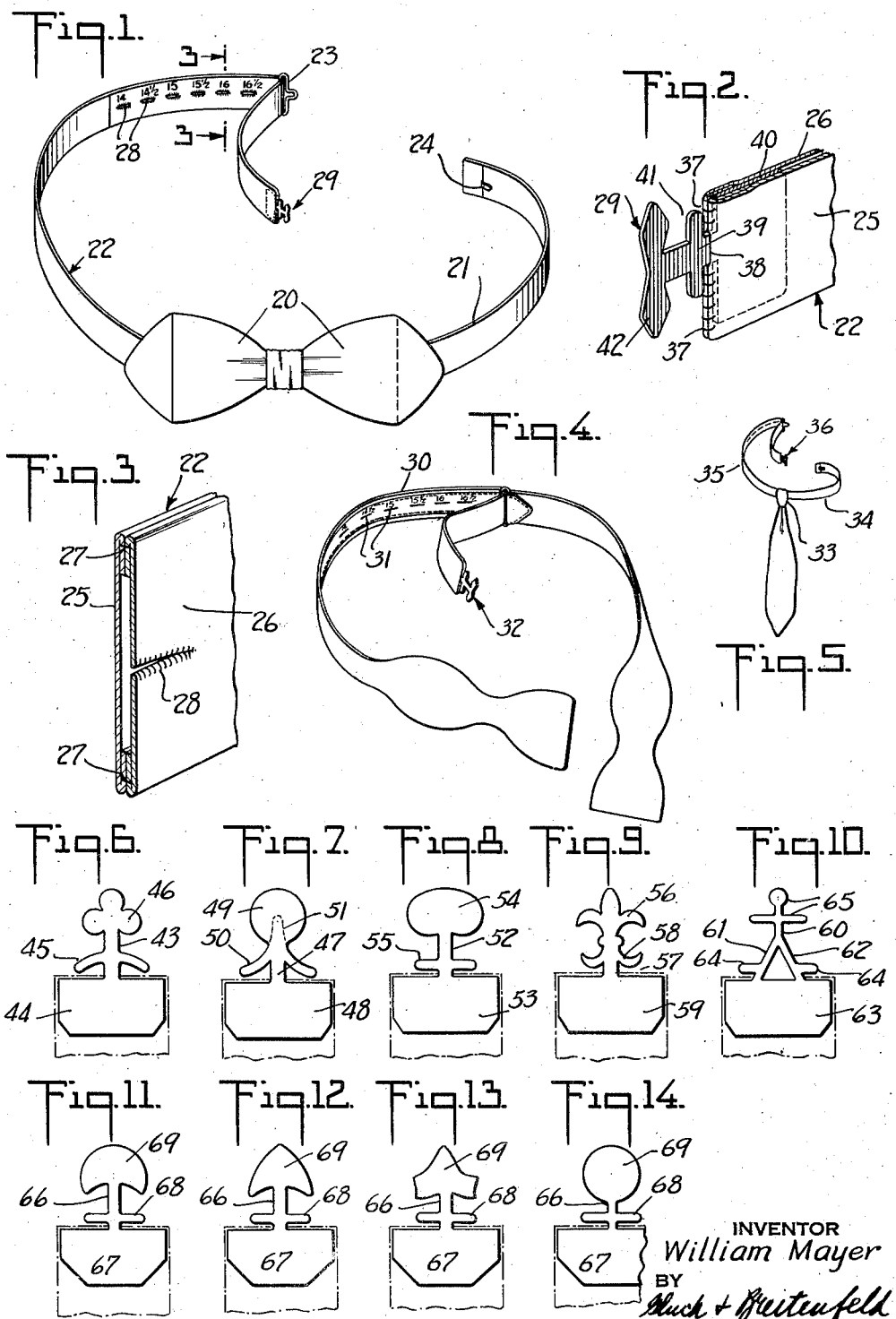
Dec. 6, 1938.  W. MAYER  2,139,510
FASTENER FOR THE NECKBAND PORTIONS OF NECKTIES
Filed June 24, 1938
INVENTOR
William Mayer

2,139,510

UNITED STATES PATENT OFFICE 2,139,510

FASTENER FOR THE NECKBAND PORTIONS OF NECKTIES

William Mayer, New York, N. Y.

Application June 24, 1938, Serial No. 215,543

6 Claims. (Cl. 2—155)

My present invention relates generally to neckwear and has particular reference to an improved type of fastener for the neckband portion of a necktie.

My invention constitutes an improvement in neckties of the well known adjustable neckband type, in which a neckband portion is provided with a series of longitudinally spaced holes, and in which the end of the neckband portion is provided with a fastening element adapted to engage in any selected one of said holes, so that the neckband portion may be doubled back upon itself to adjust the effective length of the neckband.

A general object of the invention is to provide an improved fastener whereby greater compactness is achieved, whereby undesirable bulkiness is reduced to a minimum, and whereby the manufacture of the necktie, particularly the association of the fastener with the neckband portion is greatly simplified.

In ties of this character, the neckband portion is conventionally of tubular nature, i. e., it is composed of outer and inner plies of material stitched together along their longitudinal edges. It is desirable that the fastener be of such a character, and be mounted in position in such a way, that the normal thickness of the neckband portion may not be exceeded, and it is a general object of my invention to accomplish this purpose.

The present construction is characterized by a closed end on the neckband portion, and by a fastener of flat character having a shank projecting through an aperture in said closed end. On the forward end of the shank is the fastening element proper, preferably in the form of an enlargement; on the rear end of the shank is an enlargement completely enclosed within the neckband portion so as to secure the fastener against withdrawal; and in front of said rear enlargement is a cross-piece which lies ahead of said closed end so as to prevent the fastener from slipping rearwardly into the neckband portion.

A more specific object of the invention is to provide a fastener which, when in use, is of unusually distinctive character. With this object in view, I may impart a special configuration to the enlargement at the forward end of the fastener, or to the cross-piece, or I may cause said enlargement and cross-piece conjointly to define some special configuration of ornamental or distinctive character.

I achieve the foregoing objects and such other objects as may hereinafter appear or be pointed out in the manner illustratively exemplified in the accompanying drawing in which:

Figure 1 is a perspective view of a ready-tied bow tie embodying the features of the present invention;

Figure 2 is an enlarged perspective view, partly in section, of the neckband portion and a typical fastener associated therewith;

Figure 3 is a perspective view shown partly in section along the line 3—3 of Figure 1 to show the tubular nature of the neckband portion;

Figure 4 is a view similar to Figure 1 showing the applicability of the invention to a hand-tied bow tie;

Figure 5 is a view similar to Figures 1 and 4 showing the applicability of the invention to a ready-tied four-in-hand construction;

Figure 6 is a plan view of a modified fastener; and

Figures 7–14 are views similar to Figure 6 showing further illustrative modifications.

In Figure 1 I have shown a construction in which a ready-tied bow 20 is mounted upon neckband portions 21 and 22. The portion 22 is provided with the loop 23 adapted to be engaged by the hook or equivalent fastener 24 carried at or near the end of the neckband portion 21. While, under certain circumstances, the invention might be applicable to the fastener 24, the invention has primary reference only to the neckband portion 22 and to the special fastener that is carried at its end.

The neckband portion 22 is of tubular nature as shown most clearly in Figure 3 in which I have shown, merely for illustrative purposes, an outer ply 25 and an inner ply 26, these two plies having their longitudinal edges turned inward and stitched together as at 27. The neckband portion 22 is provided with a series of longitudinally spaced openings or holes, and by way of example I have shown a series of button-holes or slits 28 formed in the ply 26. When the tie is used, it is intended that the neckband portion 22 be doubled back upon itself so that a fastener at the end of it may be releasably engaged with any selected one of these openings so as to adjust the effective length of the neckband. This fastener is designated generally, in Figures 1 and 2, by the reference numeral 29, and it is the particular construction of this fastener, and its mode of attachment, which constitutes the present improvement.

Before describing the details of the invention I draw attention to the fact that it is equally applicable to a necktie of the character shown in Figure 4 in which the neckband portion 30 is provided with the longitudinally spaced openings 31 adapted to receive the fastener 32; and to a construction of the character shown in Figure 5 in which a ready-tied knot 33 carries the neckband portions 34 and 35 which correspond to the portions 21 and 22 of Figure 1, the portion 35 being provided with openings and with the special fastener 36 at its end.

Referring now to Figure 2 it will be observed that the end of the neckband portion 22 is closed, this closed end being formed by stitching 37 which secures together the superposed ends of the plies 25 and 26. These ends may be turned in in any desired conventional manner to avoid raveling. It will be observed that this procedure leaves the normal thickness of the neckband portion 22 unimpaired.

In forming the stitches 37, a gap is left, thereby defining an aperture 38 in the closed end. This aperture is just large enough to accommodate the relatively narrow shank 39 of the present fastener. The latter is preferably composed of a single element of flat metal or the like, and at its rear end it is provided with an enlargement 40 adapted to be completely enclosed within the confines of the neckband portion 22. Ahead of, and spaced from, the enlargement 40 is the cross-piece 41 which is narrower than the neckband portion 22. At the forward end of the shank 39 there is an enlargement 42 which serves as a fastening element adapted to be releasably engaged with any selected one of the openings 28 (or 31) of the neckband portion.

Of course, in assemblying the device, the stitches 37 are not made until after the enlargement 40 has been inserted in its entirety into the end of the tubular neckband portion 22. After this has been done, the stitching 37 is performed. This completely encloses the enlargement 40 and locks the fastener against withdrawal. The cross-piece 41 lies closely adjacent to the closed end of the neckband portion, and serves the important function of preventing the fastener from slipping rearwardly into the neckband portion.

The invention lends itself to a number of interesting modifications. In Figure 2 for example the enlargement 42 is shaped to define a configuration similar to that of a bow tie. This configuration may thus serve as a convenient trade mark or identifying symbol. In Figure 6 I have illustrated a modified construction of a fastener in which the shank 43 is provided with the enlarged rear end 44, the cross-piece 45, and the fastening element 46. The latter is shown in the form of a clover or conventionalized flower, while the cross-piece 45 is convexed in an ornamental manner.

In Figure 7 the shank 47 carries the rear enlargement 48, and the fastening element 49 at the forward end. The latter is shown of circular configuration, and the cross-piece 50 is shown in the form of two downwardly divergent arms. In this case, the shank 47 and the arms 50 resemble an arrowhead, and this theme may be carried out further by suitably embellishing the element 49 as indicated at 51.

In the construction of Figure 8 the shank 52 carries the enlargement 53 and the fastening element 54, the latter being somewhat elliptical, while the cross-piece 55 is substantially straight.

In Figure 9 the enlargement 56 at the forward end of the shank 57, together with the cross-piece 58, conjointly define the outline of a fleur-de-lis. The rear enlargement 59 is the same as before.

In Figure 10 the shank 60 is divided into two portions 61 and 62 which carry the rear enlargement 63. The cross-piece 64 is also divided into two parts. The enlargement 65 at the forward end of the shank is so configured, conjointly with the other portions, that the symbolic outline of a human figure results when the fastener is applied to the neckband portion. In this case, as will readily be understood, two apertures similar to that shown at 38 in Figure 2 are required. In other words, in applying the stitching 37 two gaps have to be left to accommodate the two portions 61 and 62 of the shank.

In Figures 11-14 I have illustrated further modifications and the same reference numerals are applied to these figures, in each of which there is a shank 66, an enlarged rear end 67, a cross-piece 68, and an enlargement 69 serving as a fastening element.

The invention is characterized by the simplicity and low expense with which the fastener itself may be manufactured, its ease of assembly with the neckband portion, and the compact, flat, unbulky nature of the resultant construction. The rear enlargement is in each case completely concealed and since the cross-piece and the forward enlargement are always narrower than the neckband portion, the tie, in use, is devoid of unsightly projecting parts.

In general, it will be understood that changes in the details, herein described for the purpose of explaining the nature of my invention, may be made by those skilled in the art without departing from the spirit and scope of the invention as expressed in the appended claims. It is, therefore, intended that these details be interpreted as illustrative, and not in a limiting sense.

Having thus described my invention, what I claim as new and desire to secure by Letters Patent is:

1. In a necktie, a tubular neckband portion having a closed end with an aperture therein, and a fastener carried by said neckband portion, said fastener comprising a relatively narrow shank projecting through said aperture, an enlarged rear end on said shank completely enclosed within said neckband portion to secure the fastener against withdrawal, and a cross-piece carried by the shank ahead of said closed end to prevent the fastener from slipping rearwardly into said neckband portion.

2. In a necktie, the combination set forth in claim 1, said shank being provided at its forward end with a fastening element adapted to engage with a button-hole or the like.

3. In a necktie, the combination set forth in claim 1, said neckband portion being provided with a series of longitudinally spaced holes, and said shank being provided at its forward end with a fastening element, whereby the neckband portion may be doubled upon itself to bring said fastening element into cooperative relation to any selected one of said holes.

4. In a necktie, the combination set forth in claim 1, said tubular neckband portion comprising inner and outer plies of material stitched together along their longitudinal edges, the closed end being formed by stitching together the superposed ends of said plies, the aperture in said closed end being formed by a gap in said last-mentioned stitching.

5. In a necktie, the combination set forth in claim 1, said shank being provided at its forward end with an enlargement serving as a fastening element for engagement with a button-hole or the like, said enlargement and said cross-piece being conjointly configured to a unitary ornamental outline.

6. In a necktie, the combination set forth in claim 1, said shank being provided at its forward end with an enlargement serving as a fastening element for engagement with a button-hole or the like, both said enlargement and said cross-piece being narrower than the neckband portion.

WILLIAM MAYER.